United States Patent
Ishii et al.

(10) Patent No.: US 7,965,369 B2
(45) Date of Patent: Jun. 21, 2011

(54) DISPLAY DEVICE

(75) Inventors: Miyo Ishii, Chiba (JP); Manabu Yamashita, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 255 days.

(21) Appl. No.: 12/471,677

(22) Filed: May 26, 2009

(65) Prior Publication Data

US 2009/0290101 A1    Nov. 26, 2009

(30) Foreign Application Priority Data

May 26, 2008 (JP) ................................ 2008-137296

(51) Int. Cl.
*G02F 1/1345* (2006.01)
(52) U.S. Cl. .......... 349/152; 349/84; 349/122; 349/138; 349/139; 349/149
(58) Field of Classification Search .................... 349/56, 349/84, 122, 138, 139, 149, 152
See application file for complete search history.

(56) References Cited

U.S. PATENT DOCUMENTS

| 6,961,112 B2 * | 11/2005 | Yoshimura et al. ........... 349/187 |
| 7,417,693 B2 * | 8/2008 | Kawasaki ....................... 349/43 |
| 2005/0030450 A1 | 2/2005 | Okamoto et al. |

FOREIGN PATENT DOCUMENTS

JP    2004-046223    2/2004

* cited by examiner

*Primary Examiner* — Jennifer Doan
(74) *Attorney, Agent, or Firm* — Antonelli, Terry, Stout & Kraus, LLP.

(57) ABSTRACT

A display device is provided which comprises a first conductive layer in which a first electrode film is formed, a first insulating layer provided over the first conductive layer, a second conductive layer provided over the first insulating layer and in which a second electrode film is formed at a position different, in plane, from the first electrode film, and a second insulating layer provided over the second conductive layer. Over a surface of the second insulating layer, a recess having, in its inside, a first region in which the first electrode film is exposed, a second region in which the second electrode film is exposed, and a third region which connects the first region and the second region is formed, and a conductive film is formed at least in the first through the third regions.

13 Claims, 11 Drawing Sheets

DISPLAY DEVICE

CROSS-REFERENCE TO RELATED APPLICATION

The present application claims priority from Japanese application JP 2008-137296 filed on May 26, 2008, the content of which is hereby incorporated by reference into this application.

BACKGROUND OF THE INVENTION

1. Field of the Invention

The present invention relates to a display device, and, in particular, to a display device having a structure for electrically connecting electrode films which are formed in different layers of a substrate.

2. Description of the Related Art

Figure 25:
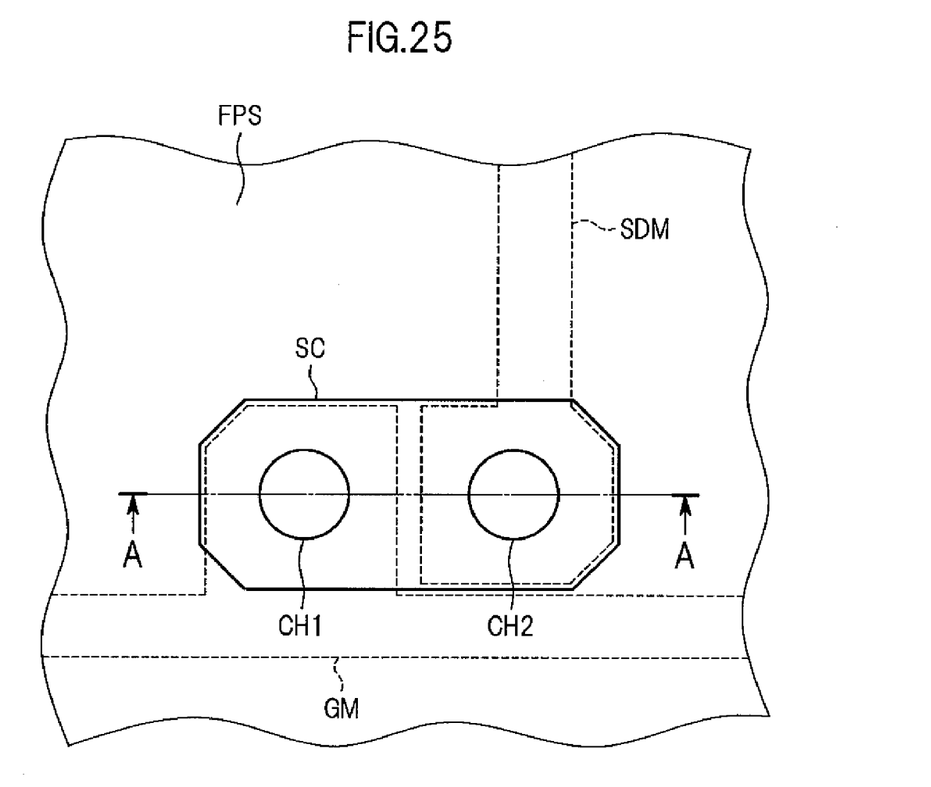
FIG. 25 is a plan view showing an interlayer switching section of related art.
Figure 26:
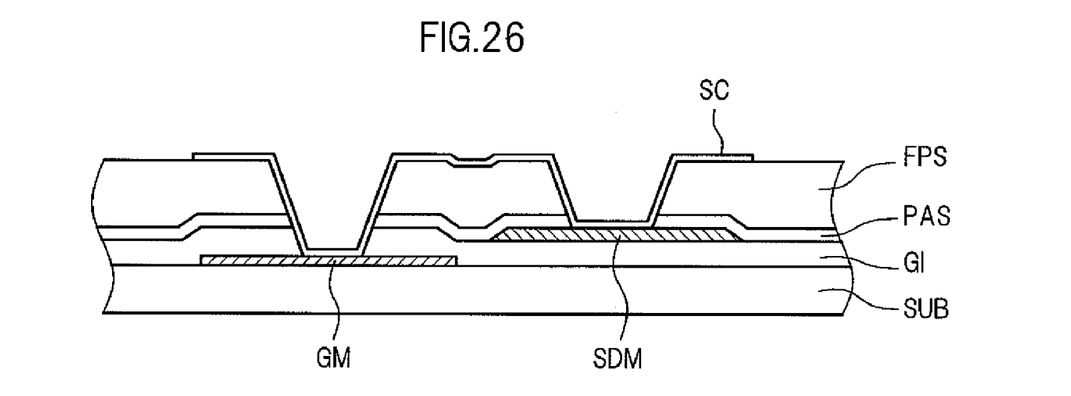
FIG. 26 is a cross sectional diagram along an A-A cutting line of FIG. 25.

In a display device such as a liquid crystal display device, a plurality of conductive layers are formed, with a layer of insulating material therebetween, over an array substrate forming a part of the display device. In order to electrically connect the lines existing in such a plurality of conductive layers, an interlayer switching section as shown in FIGS. 25 and 26 may be used in some cases. FIG. 25 is a plan view showing an interlayer switching section of related art and FIG. 26 is a cross sectional diagram along an A-A cutting line of FIG. 25.

The array substrate has a multilayer structure comprising a gate electrode film GM, a gate insulating film GI provided over the layer of the gate electrode film GM, a drain electrode film SDM provided over the gate insulating film GI, a passivation film provided over the layer of the drain electrode film SDM, and a conductive film SC provided over the passivation film. In the example configuration of FIGS. 25 and 26, the passivation film comprises a layer of an inorganic insulating film PAS and a layer of an organic insulating film FPS provided over the layer of the inorganic insulating film PAS.

In the interlayer switching section, on the array substrate, a first contact hole CH1 which reaches the gate electrode film GM and a second contact hole CH2 which reaches the drain electrode film SDM are formed, and the interlayer switching section comprises the conductive film SC. The conductive film SC is formed to include the inside of the two contact holes including regions where the electrode films are exposed, and a region of a surface of the passivation film between the contact holes. With the interlayer switching section, a line formed in the layer of the gate electrode film GM and a line formed in the layer of the drain electrode film SDM can be electrically connected to each other.

JP 2004-46223 A discloses an interlayer switching section which electrically connects the lines existing in a plurality of conductive layers.

In the interlayer switching section of the array substrate in the above-described display device, of the region of the conductive film SC, the region connecting between the two contact holes CH1 and CH2 is exposed over the passivation film. Because of this, when a physical contact occurs in this region, there is a possibility of disconnection.

SUMMARY OF THE INVENTION

The present invention was conceived in view of the above-described circumstances, and an advantage of the present invention is that a display device is provided having an array substrate in which the possibility of occurrence of the disconnection in the interlayer switching section is reduced.

In order to achieve at least the advantage described above, according to one aspect of the present invention, there is provided a display device comprising a first conductive layer in which a first electrode film is formed, a first insulating layer provided over the first conductive layer, a second conductive layer provided over the first insulating layer and in which a second electrode film is formed at a position, in plane, different from the first electrode film, and a second insulating layer provided over the second conductive layer, wherein a recess is formed over a surface of the second insulating layer, the recess having, in its inside, a first region in which the first electrode film is exposed, a second region in which the second electrode film is exposed, and a third region which connects the first region and the second region, and a conductive film is formed at least in the first through the third regions.

According to another aspect of the present invention, it is preferable that, in the display device, in the recess, a first hole which is formed through the second insulating layer and the first insulating layer and reaches the first electrode film, a second hole which is provided distanced from the first hole and which is formed through the second insulating layer and reaches the second electrode film, and a channel which connects the first hole and the second hole are formed.

According to another aspect of the present invention, it is preferable that, in the display device, the first electrode film and the second electrode film are provided with edges overlapping each other in the plane, a sloped surface extending from an inner wall of the second electrode film to an upper surface of the first electrode film is formed in the recess, and the conductive film is formed at least over the sloped surface.

According to another aspect of the present invention, it is preferable that, in the display device, in the recess, the sloped surface extends to an upper surface of the second electrode film.

According to another aspect of the present invention, it is preferable that, in the display device, the conductive film is formed at a periphery portion which is outside of an edge of the recess.

According to another aspect of the present invention, it is preferable that the display device further comprises a step provided inside the edge of the recess and having a height lower than an outside of the edge, wherein the conductive film is formed over the step.

According to another aspect of the present invention, it is preferable that, in the display device, the second insulating layer is formed with a plurality of films of different materials.

According to another aspect of the present invention, it is preferable that, in the display device, the second insulating layer includes an organic insulating film.

According to another aspect of the present invention, there is provided a display device comprising a first conductive layer, a first insulating layer provided over the first conductive layer, a second conductive layer provided over the first insulating layer, and a second insulating layer provided over the second conductive layer, wherein a first contact hole formed in the second insulating layer over the first conductive layer and a second contact hole formed in the second insulating layer over the second conductive layer are formed, a channel which connects the first contact hole and the second contact hole is formed in the second insulating layer, and the first conductive layer and the second conductive layer are electrically connected by a third conductive layer formed in the first contact hole, the second contact hole, and the channel.

According to another aspect of the present invention, it is preferable that, in the display device, the second insulating layer includes an organic insulating film.

According to another aspect of the present invention, it is preferable that, in the display device, the third conductive layer is a transparent conductive film.

According to another aspect of the present invention, it is preferable that the display device comprises a plurality of pixel electrodes, and the third conductive layer and the pixel electrode are a transparent conductive film formed in a same layer.

According to another aspect of the present invention, it is preferable that the display device comprises a plurality of pixel electrodes and a plurality of thin film transistors which are connected to the plurality of pixel electrodes, and gate electrodes of the plurality of thin film transistors are connected to the first conductive layer through a testing transistor, the second conductive layer, and the third conductive layer.

According to various aspects of the present invention, because a region which connects the first electrode film and the second electrode film is formed inside the recess, it is possible to suppress physical contact with respect to the conductive film formed over this region. With such a structure, a display device having an array substrate can be provided in which the possibility of the disconnection in the interlayer switching section is reduced.

DETAILED DESCRIPTION OF THE INVENTION

Preferred embodiments of the present invention will now be described in detail with reference to the drawings. In the following description of the preferred embodiments of the present invention, an example configuration is described in which the present invention is applied to an IPS liquid crystal display device.

First Preferred Embodiment

A display device according to a first preferred embodiment of the present invention is a liquid crystal display device comprising an array substrate TS, a filter substrate FS which opposes the array substrate TS and in which a color filter is provided, a liquid crystal material filled in a region sandwiched between the array substrate TS and the filter substrate FS, and a driver IC mounted on the array substrate TS. The array substrate TS and the filter substrate FS are glass substrates or the like.

Figure 1:
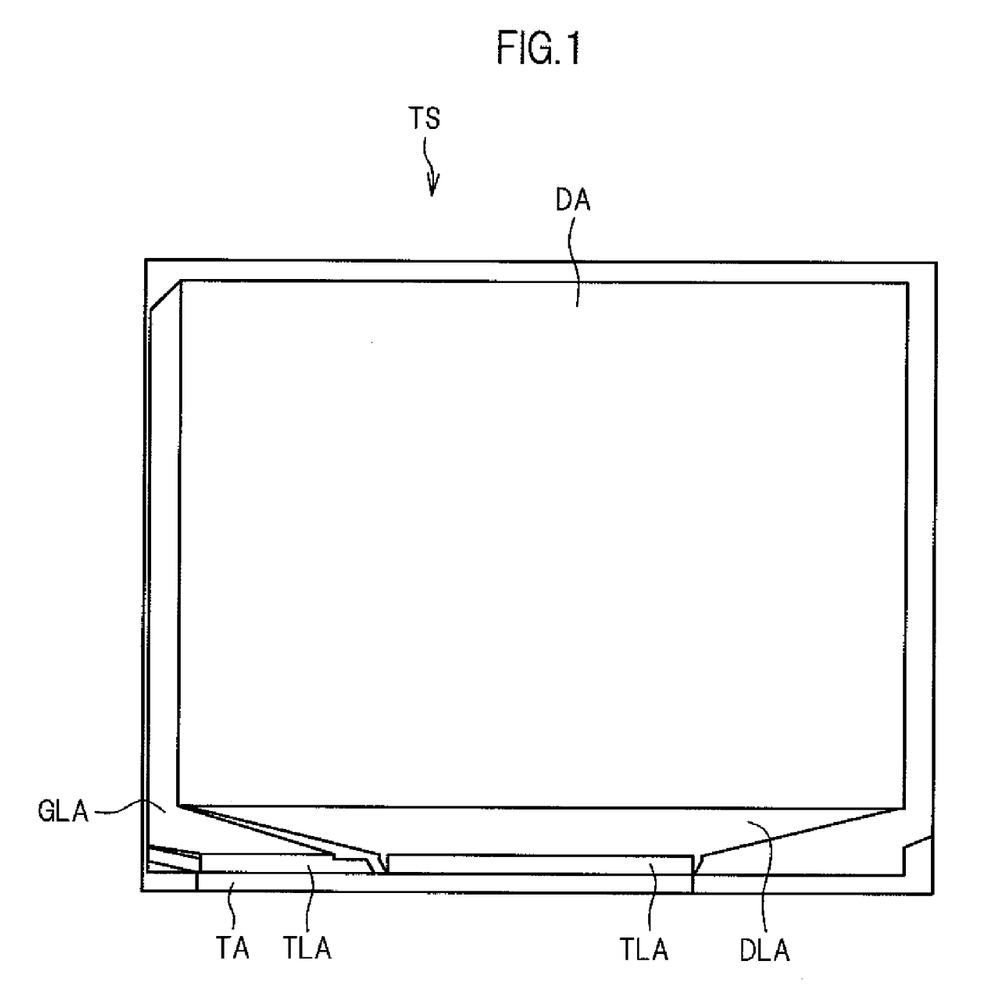
FIG. 1 is a plan view showing a layout of an array substrate according to a preferred embodiment of the present invention.

FIG. 1 is a plan view showing a layout of an array substrate TS according to the preferred embodiment. Over the array substrate TS, a pixel region DA, a gate line extension region GLA, a drain line extension region DLA, a terminal portion TA, and a line region around the terminal portion TLA are placed. In the pixel region DA, aplurality of pixel circuits for displaying an image are placed. The gate line extension region GLA is provided adjacent to the pixel region DA at the left side of the pixel region DA. The drain line extension region DLA is provided adjacent to the pixel region DA at the lower side of the pixel region DA. The terminal portion TA is a region at a lower end of the array substrate TS and comprises a connection terminal with the outside. The line region around the terminal portion TLA is provided between the terminal portion TA and the gate line extension region GLA and between the terminal portion TA and the drain line extension region DLA.

In the pixel circuit of the pixel region DA, a gate line, a drain line, a thin film transistor, a pixel electrode, etc. are formed. The pixel region DA corresponds to a display region in a liquid crystal display device. A plurality of the gate lines extend in the pixel region DA along a horizontal direction in parallel to each other, and a plurality of the drain lines extend in the pixel region DA along a vertical direction in parallel to each other. A thin film transistor is provided at a location corresponding to an intersection of the gate line and the drain line. A gate electrode of the thin film transistor is connected to the gate line and a drain electrode of the thin film transistor is connected to the drain line. In the gate line extension region GLA, a plurality of lines (hereinafter referred to as "gate connecting lines") from the gate line to the driver IC are placed. In the drain line extension region DLA, a plurality of lines (hereinafter referred to as "drain connecting lines") from the drain line to the driver IC are placed. In addition, the line region around the terminal portion TLA is a region where lines for connecting the terminal portion TA, the gate connecting line GL, the drain connecting line, and the driver IC are provided.

Figure 2:
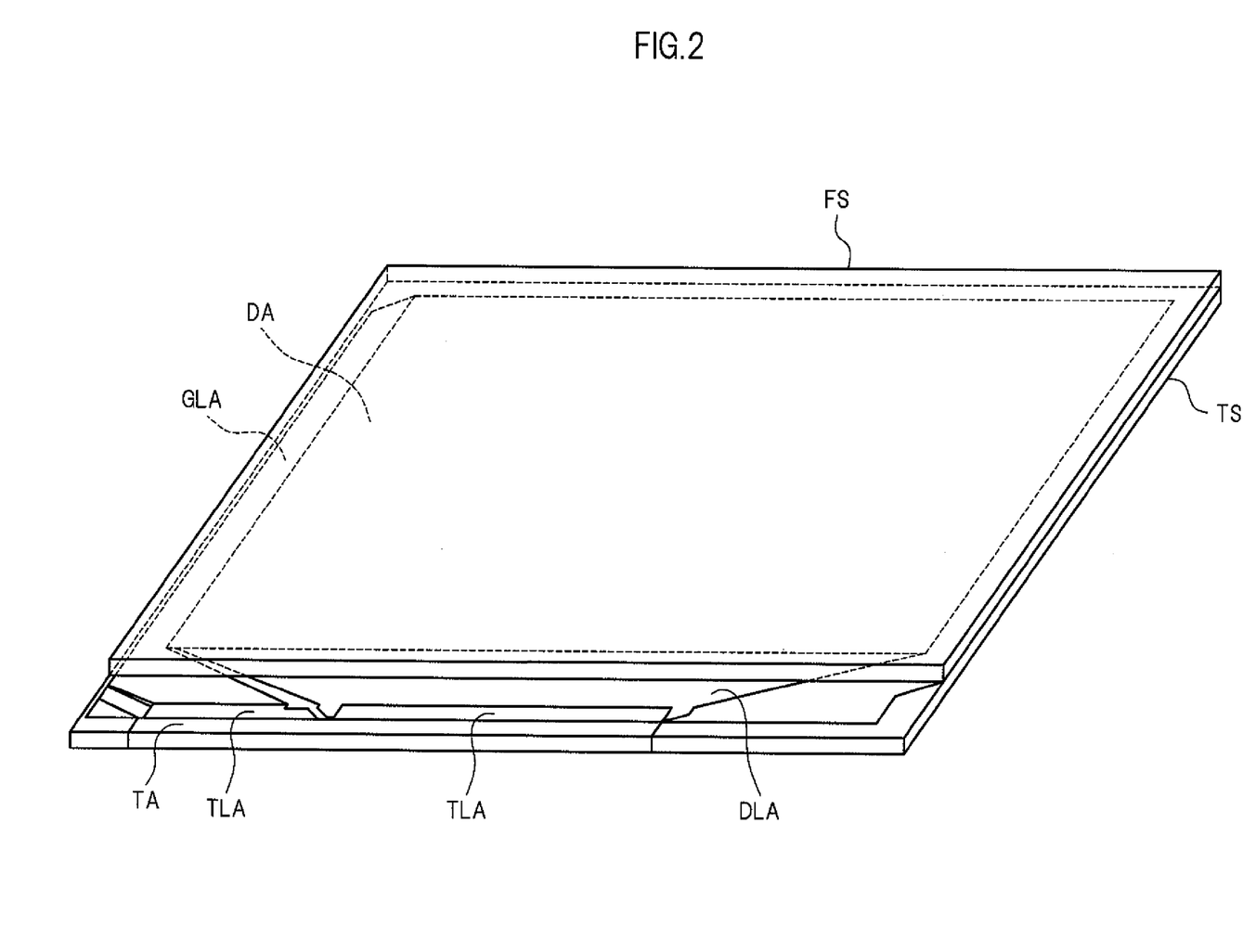
FIG. 2 is a diagram showing a structure of an array substrate and a filter substrate according to a preferred embodiment of the present invention.

FIG. 2 is a diagram showing a structure of the array substrate and the filter substrate in the preferred embodiment of the present invention. The filter substrate FS is provided opposing the array substrate LS, covering the pixel region DA and the periphery around the pixel region DA, and a liquid crystal material is sealed in the sandwiched region. The filter substrate, on the other hand, does not reach the region above the line region around the terminal portion TLA and the terminal portion TA. This is because it is necessary to connect to the outside and place the driver IC. Thus, the surface of the line region around the terminal portion TLA is exposed to the outside.

Figure 3:
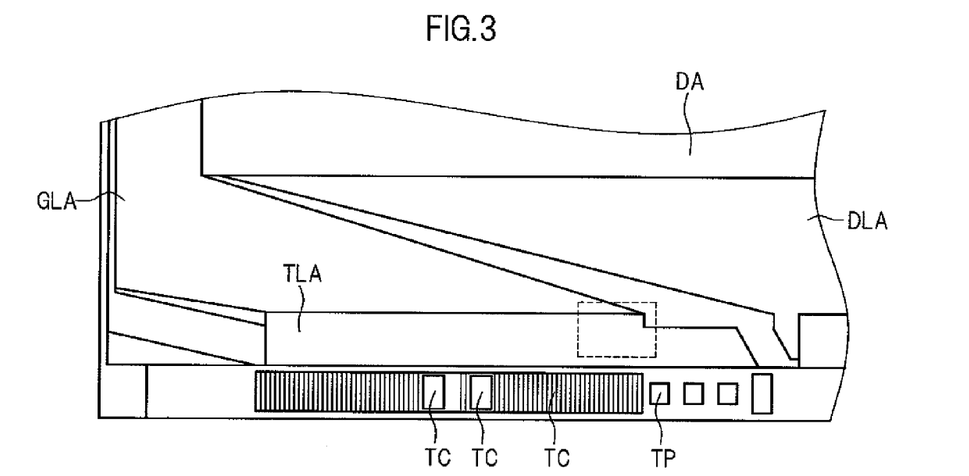
FIG. 3 is a partial plan view of a layout of an array substrate according to a preferred embodiment of the present invention.

FIG. 3 is a partial plan view of a layout of the array substrate TS according to the preferred embodiment of the present invention. FIG. 3 is an enlarged view of a region at the bottom left of FIG. 1. In the region of the terminal portion TA of FIG. 1, a connection terminal TC and a light emission testing signal pad TP are placed, and signals from the outside are input through these elements.

Figure 4:
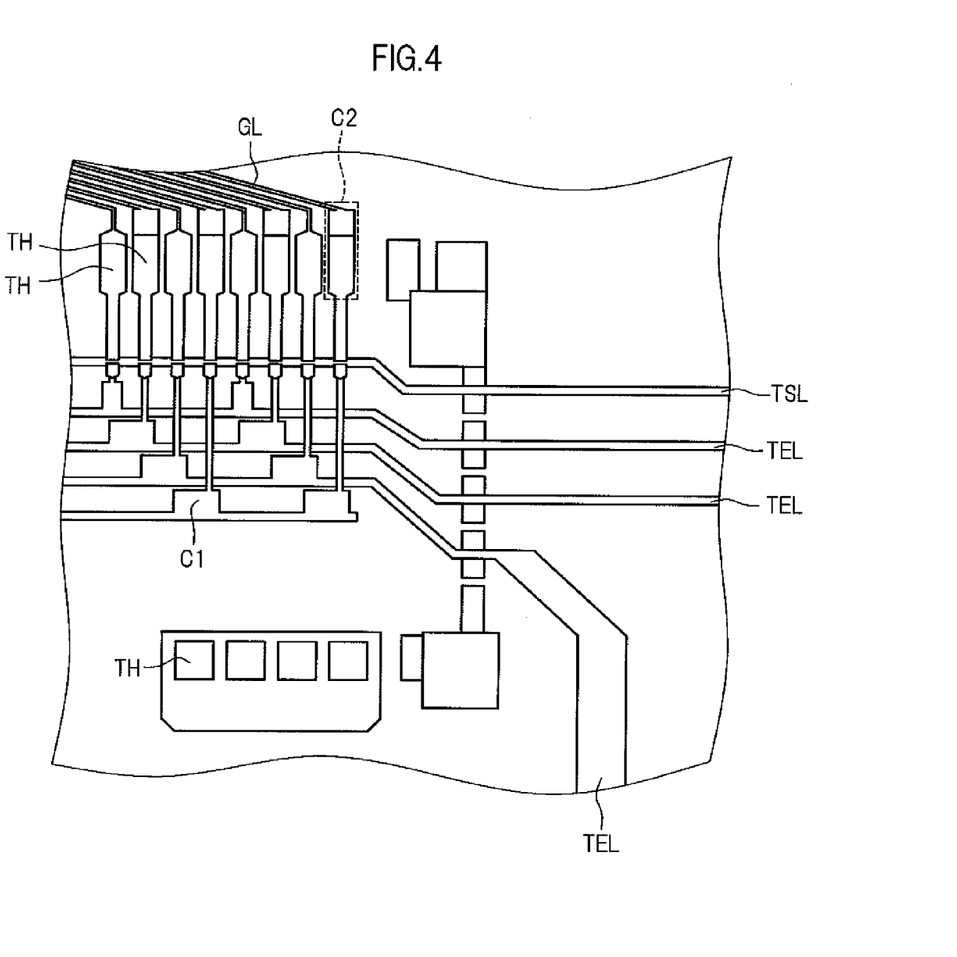
FIG. 4 is a partial plan view of a line region around a terminal portion of FIG. 3.
Figure 5:
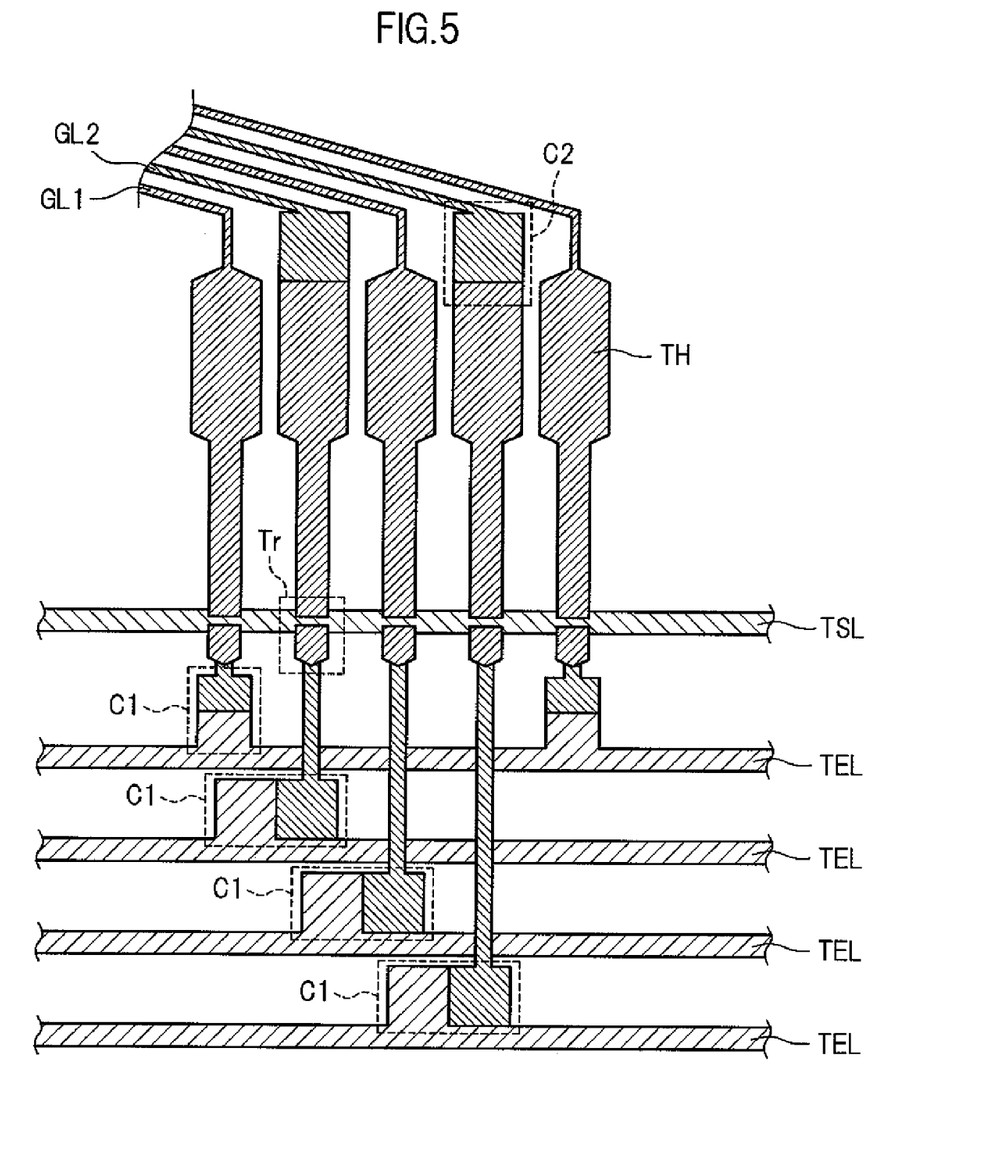
FIG. 5 is a partial plan view of an area around an interlayer switching section.

FIG. 4 is a partial plan view of the line region around the terminal portion TLA of FIG. 3. FIG. 4 corresponds to a region of FIG. 3 surrounded by the dotted line. Over the line region around the terminal portion TLA, a plurality of through holes TH for connecting the driver IC and various lines on the array substrate TS are formed. In a region in FIG. 4 which is sandwiched by the arrays of the through holes TH at the top and bottom, a circuit for testing light emission is present. FIG. 5 is a partial enlarged plan view of a region around the circuit for light emission test including interlayer switching sections C1 and C2. Lines which extend from a light emission testing transistor Tr in the upward and downward directions are lines which extend from the drain electrode and the source electrode of the light emission testing transistor. When the light emission is tested, a voltage is applied to a light emission testing signal line TSL, and the light emission testing transistor Tr is switched ON. Then, the signal for light emission test which is input through the light emission testing signal line TEL is output to the gate line. The interlayer switching section C1 is provided to connect the light emission testing signal line TEL and the line extending from the light emission testing transistor Tr.

Figure 6:
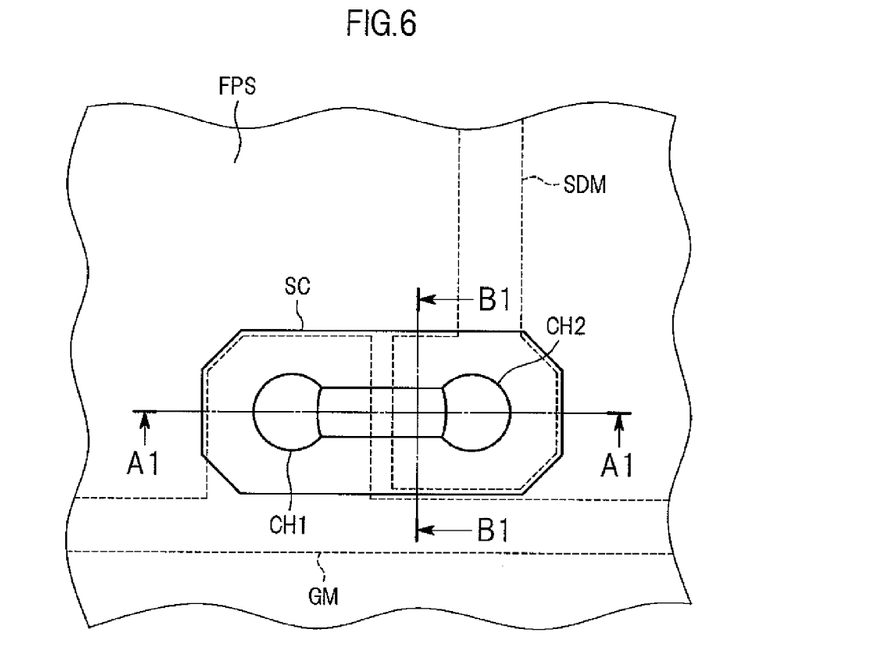
FIG. 6 is a plan view of an interlayer switching section according to a first preferred embodiment of the present invention.

FIG. 6 is a plan view of the interlayer switching section C1 of the first preferred embodiment of the present invention. The drain electrode film SDM extends toward the light emission testing transistor Tr, and the gate electrode film GM is connected to the light emission testing signal pad TP through the light emission testing signal line TEL. As is clear from FIG. 6, the gate electrode film GM has a region of a shape, in the plane, of a rectangle with two corners beveled, and the drain electrode film SDM also has a region of a shape, in the plane, of a rectangle with two corners beveled. The lengths of the sides of the region of the gate electrode film GM and the region of the drain electrode film SDM which are not beveled are approximately equal to each other. The two regions are placed so that the regions do not overlap and the non-beveled sides are aligned parallel to each other with a predetermined gap. The contact hole CH1 is formed above the gate electrode film GM, and the contact hole CH2 is formed above the drain electrode film SDM. In addition, in the region between the two contact holes CH1 and CH2, a channel which connects the two contact holes is provided. Over the surface of the interlayer switching section, a region of the conductive film SC is formed over inside of the two contact holes CH1 and CH2 and the channel, and a peripheral portion existing at the outside of the edges. More specifically, the region of the conductive film SC exists, in the plane, covering the above-described region of the gate electrode film GM and the above-described region of the drain electrode film SDM. Over the surface of the region around these regions, the organic insulating film FPS is exposed.

Figure 7:
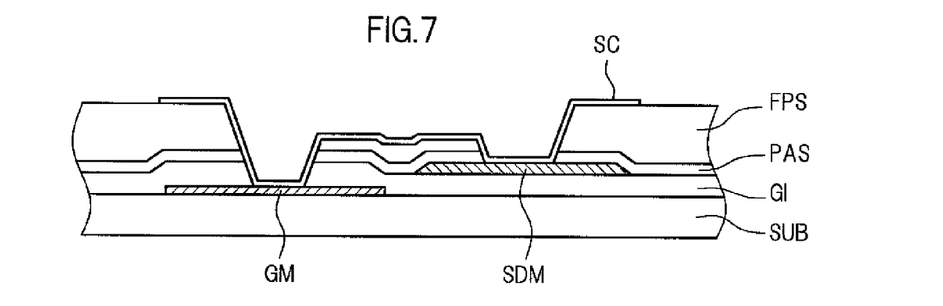
FIG. 7 is a cross sectional diagram along an A1-A1 cutting line of FIG. 6.
Figure 8:
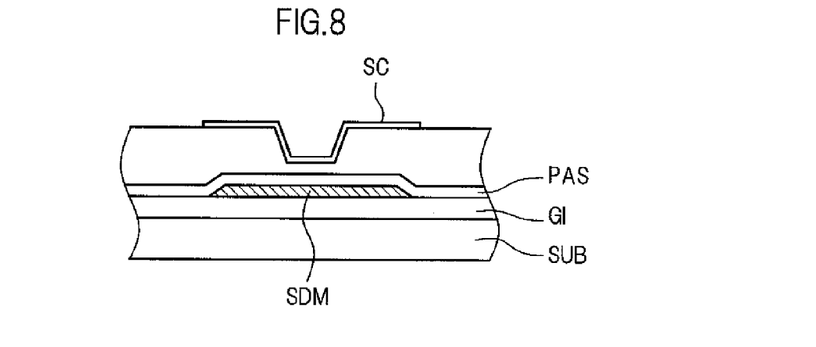
FIG. 8 is a cross sectional diagram along a B1-B1 cutting line of FIG. 6.

FIG. 7 is a cross sectional diagram along an A1-A1 cutting line of FIG. 6. FIG. 8 is a cross sectional diagram along a B1-B1 cutting line of FIG. 6. As is clear from FIGS. 7 and 8, in the interlayer switching section C1, a gate electrode film GM, a gate insulating film GI, a drain electrode film SDM, an inorganic insulating film PAS, and an organic insulating film FPS are sequentially layered over a substrate SUB. In addition, the contact hole CH1 has a tapered shape, and is formed through the organic insulating film FPS, the inorganic insulating film PAS, and the gate insulating film GI and reaches the gate electrode film GM. The contact hole CH2 also has a tapered shape, and is formed through the organic insulating film FPS and the inorganic insulating film PAS and reaches the drain electrode film SDM. A thickness of the organic insulating film FPS at a portion of the channel connecting the two contact holes CH1 and CH2 is thinner than the regions other than the channel. More specifically, the FPS film has a thickness of 0.6 μm-1.0 μm at the channel region and about 2.0 μm in regions other than the channel. The two contact holes CH1 and CH2 and the channel connecting the contact holes form a recess. The recess includes a region present at the bottom of the contact hole CH1 where the gate electrode film GM is exposed, a region at the bottom of the contact hole CH2 where the drain electrode film SDM is exposed, inner walls of the contact holes CH1 and CH2 between these regions, and the above-described region of the channel. The conductive film SC is formed filling the inside of the recess formed in the organic insulating film FPS, and the conductive film SC is also formed over the upper surface of the organic insulating film FPS adjacent to the recess. Alternatively, a configuration may be employed in which the conductive film only fills the recess.

With this structure, because a region which connects the gate electrode film GM and the drain electrode film SDM is formed inside the above-described recess, the physical contact to the conductive film SC formed over this region can be suppressed. With this structure, it is possible to reduce the possibility of disconnection due to scratches of the like. In addition, because the thickness of the organic insulating film is thinner in the channel than in the other regions, the amount of elastic deformation is correspondingly lower. Therefore, the influence due to the elastic deformation can be reduced. More specifically, the occurrences of the scratches or cracks can be suppressed and the possibility of disconnection can be reduced. The organic insulating film FPS is softer compared to the inorganic insulating film PAS, and is weaker against scratches or the like.

In FIG. 5, there is another interlayer switching section C2. The interlayer switching section C2 is provided for connecting the gate connecting line GL1 present in the layer of the gate electrode film GM (hereinafter referred to as "gate conductive layer") and a through hole TH formed in the layer of the drain electrode film SDM (hereinafter referred to as "drain conductive layer"). For the interlayer switching section C2, a structure similar to the interlayer switching section C1 which has been described may be employed, to reduce the possibility of disconnection. The gate connecting line GL1 is present in the drain conductive layer because the gate connecting lines are alternately placed in both the gate conductive layer and the drain conductive layer (staggered line) in order to improve the equipping density. The gate connecting line GL1 is provided in the drain conductive layer and a gate connecting line GL2 is provided in the gate conductive layer.

Next, a manufacturing process of the array substrate TS will be described. FIGS. 9-12 are diagrams showing the manufacturing process of the array substrate TS according to a preferred embodiment of the present invention. The left side of FIGS. 9-12 is the cross sectional diagram of a transistor region over the pixel region DA and the right side is the cross sectional diagram of the through hole reaching the gate conductive layer over the line region around the terminal portion TLA.

Figure 9:
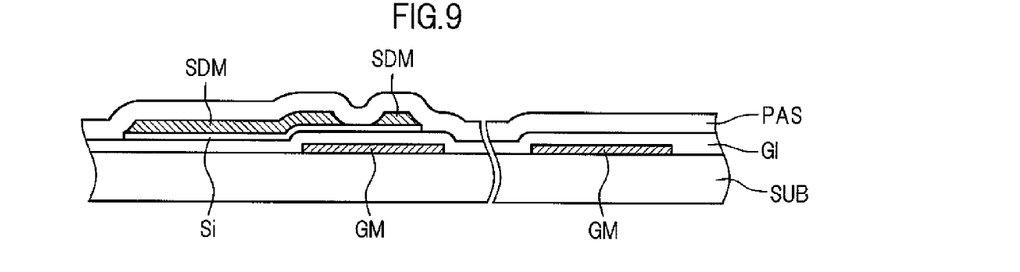
FIG. 9 is a diagram showing a manufacturing process of an array substrate according to a preferred embodiment of the present invention.

First, a film of MoCr/AlNd or the like is formed over the substrate SUB, and the gate electrode film GM is formed through photolithography. Then, a film of silicon nitride is formed and the layer of the gate insulating film GI is formed. Next, a semiconductor layer Si which is a layer including materials such as amorphous silicon is formed, and is patterned through photolithography. Then, a film of MoCr or the like is formed, and, through photolithography, the drain electrode film SDM including the source line and the drain line of the transistor is formed. A film of silicon nitride is then formed over the drain electrode film SDM, to form the layer of the inorganic insulating film PAS. FIG. 9 is a diagram showing the array substrate TS at this stage.

Figure 10:
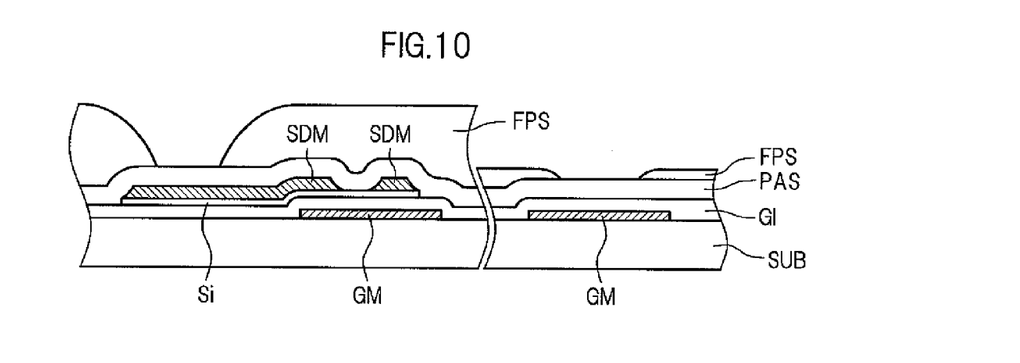
FIG. 10 is a diagram showing a manufacturing process of an array substrate according to a preferred embodiment of the present invention.

Then, a photosensitive organic resin film or the like is applied over the array substrate TS in the state shown in FIG. 9, exposed, developed, and annealed. With this process, the organic insulating film FPS is formed. FIG. 10 shows the array substrate TS at this stage. During the exposure, a halftone exposure may be applied as necessary in the line region around the terminal portion TLA, to provide a region where the thickness of the organic insulating film FPS is thin. In FIG. 10, the region around the through hole is halftone-exposed, to achieve a thinner thickness of the organic insulating film FPS.

In the interlayer switching section C1, the region of the channel between the contact holes CH1 and CH2 is halftone-exposed, to achieve a thinner thickness of the organic insulating film FPS. With this structure, because the thickness of the organic insulating film FPS around the channel is thick, a channel is formed over the organic insulating film FPS (refer to FIG. 8).

Figure 11:
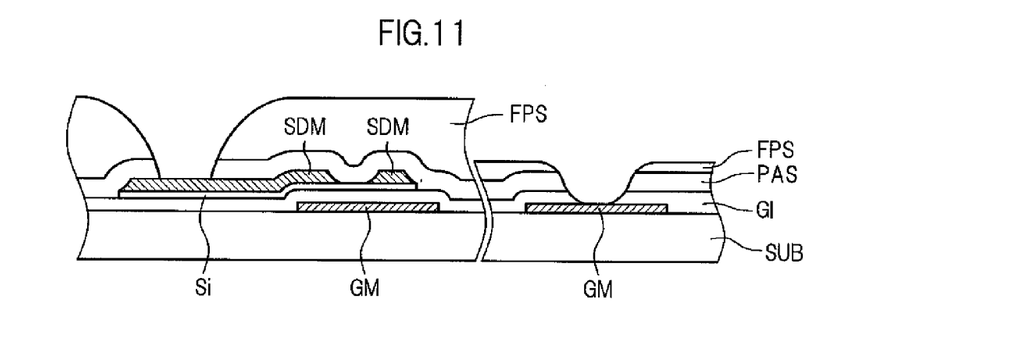
FIG. 11 is a diagram showing a manufacturing process of an array substrate according to a preferred embodiment of the present invention.

Next, the inorganic insulating film PAS and the gate insulating film GI are etched until the electrode film is reached, with the organic insulating film FPS of the array substrate TS in the state of FIG. 10 used as a mask. As the method of etching, a method is employed in which a fluorocarbon-based gas is used and the etched portion becomes a tapered shape. FIG. 11 is a diagram showing the array substrate TS at this stage. In FIG. 11, the inorganic insulating film PAS is etched until reaching the drain electrode film SDM in a region where the organic insulating film FPS is not present over the drain electrode film SDM (refer to the pixel region DA at the left), and the inorganic insulating film PAS and the gate insulating film GI are etched until reaching the gate electrode film GM in a region where the organic insulating film FPS or the drain electrode film SDM is not present over the gate electrode film GM (refer to the through hole of the line region around the terminal portion TLA at the right).

Figure 12:
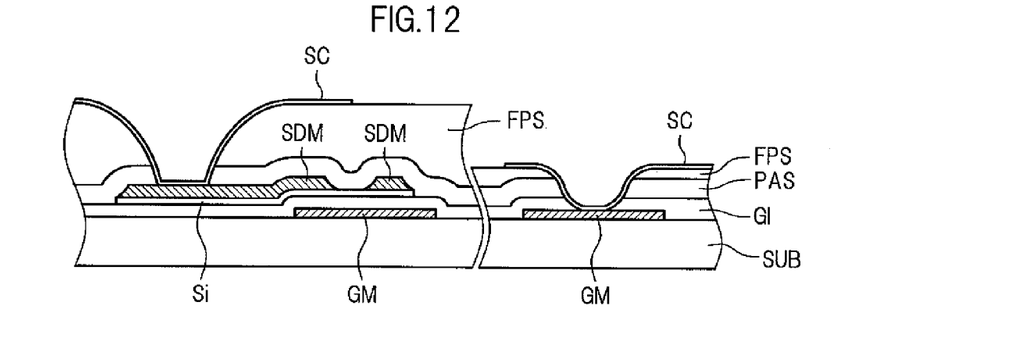
FIG. 12 is a diagram showing a manufacturing process of an array substrate according to a preferred embodiment of the present invention.

A conductive film is formed with a substance which forms a material of the conductive film SC such as, for example, ITO (Indium Tin Oxide) over the array substrate TS in the state as shown in FIG. 11. The conductive film is patterned through photolithography, to complete the array substrate TS. FIG. 12 is a diagram showing the completed array substrate TS. Here, ITO can form a transparent conductive film. In the pixel circuit of the pixel region DA, the conductive film is formed as a pixel electrode connected to the thin film transistor.

In this process, the number of times of photolithography is reduced by applying the etching process of the inorganic insulating film PAS and the gate insulating film GI with the organic insulating film FPS used as a mask. More specifically, the step of applying photolithography to the inorganic insulating film PAS and the gate insulating film GI prior to the formation of the organic insulating film is omitted. With this configuration, the manufacturing cost can be reduced. In addition, it is easier to form the organic insulating film in a thick thickness than the inorganic insulating film, and, with this configuration, it is possible to easily realize reduction of capacitance coupling in the array substrate TS of the liquid crystal display device.

Second Preferred Embodiment

As a display device according to the second preferred embodiment of the present invention has a structure similar to that in the first preferred embodiment (refer to FIGS. 1-5) except for the interlayer switching sections C1 and C2, in the second preferred embodiment, a difference from the first preferred embodiment in the structure of the interlayer switching section C1 and the manufacturing process of the array substrate TS will be primarily described.

Figure 13:
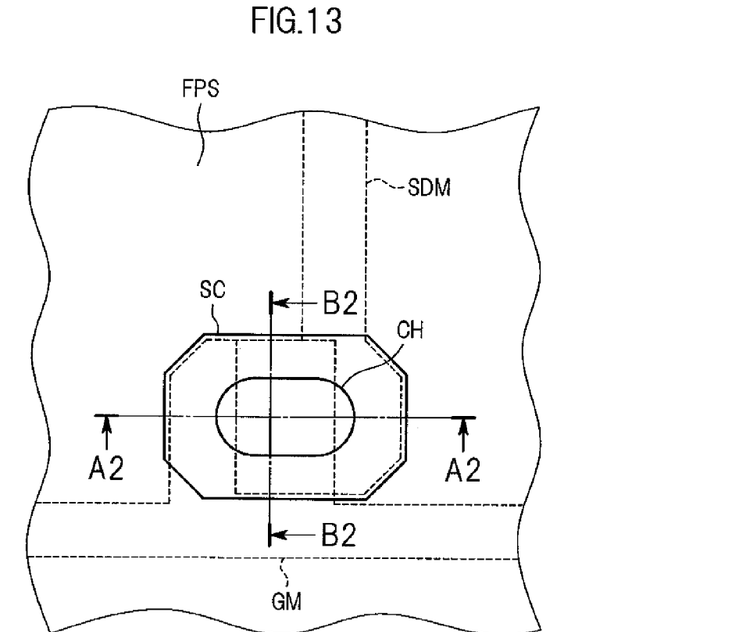
FIG. 13 is a plan view of an interlayer switching section according to a second preferred embodiment of the present invention.

FIG. 13 is a plan view of the interlayer switching section C1 of the second preferred embodiment. The structures to which the drain electrode film SDM and the gate electrode film GM are connected are similar to those in the first preferred embodiment. As is clear from FIG. 13, the gate electrode film GM has a region having a rectangular shape with two beveled corners in the plane. The drain electrode film SDM similarly has a region having a rectangular shape with two beveled corners in the plane. Lengths of the sides which are not beveled are approximately equal between the region of the gate electrode film GM and the region of the drain electrode film SDM, and a region of a predetermined width from the non-beveled side of the region of the drain electrode film SDM and a region of a predetermined width from the non-beveled side of the region of the gate electrode film GM overlap in the plane. That is, these regions are provided to be in a step shape. An elliptical hole CH is formed over the region where the gate electrode film GM and the drain electrode film SDM overlap in the plane and the region where there is no electrode film SDM over the gate electrode film GM. Over the surface of the interlayer switching section, a region of the conductive film SC is formed over the above-described hole CH and the periphery of the hole CH. More specifically, the region of the conductive film SC is provided to cover, in the plane, a region formed by the combination of the gate electrode film GM and the drain electrode film SDM. Over the surface of the peripheral region, the organic insulating film FPS is exposed.

Figure 14:
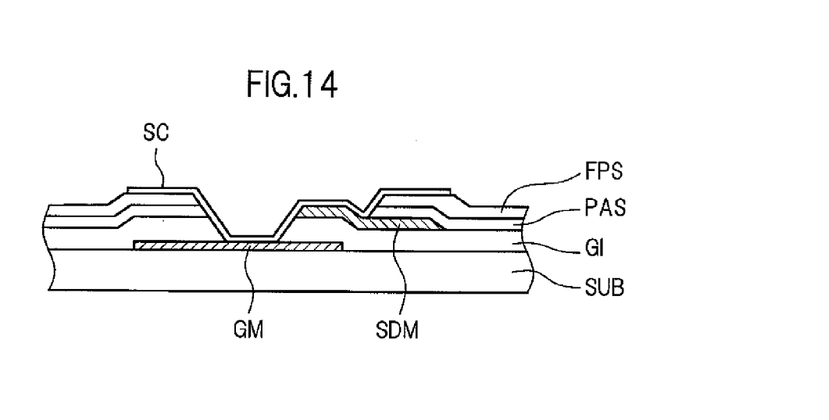
FIG. 14 is a cross sectional diagram along an A2-A2 cutting line of FIG. 13.
Figure 15:
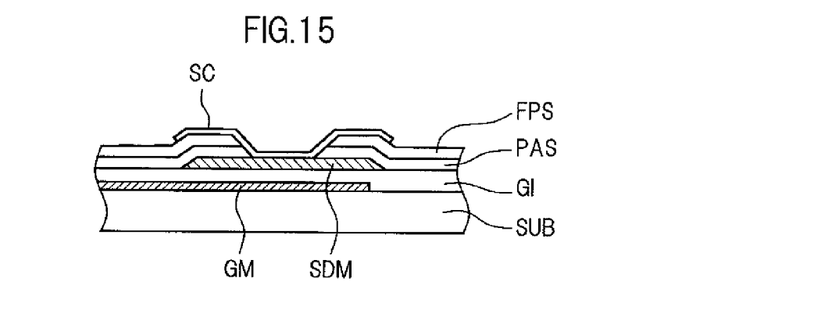
FIG. 15 is a cross sectional view along a B2-B2 cutting line of FIG. 13.

FIG. 14 is a cross sectional diagram along an A2-A2 cutting line of FIG. 13. FIG. 15 is a cross sectional diagram along a B2-B2 cutting line of FIG. 13. As is clear from FIGS. 14 and 15, at the interlayer switching section C1, the gate electrode film GM, the gate insulating film GI, the drain electrode film SDM, the inorganic insulating film PAS, and the organic insulating film FPS are sequentially layered over the substrate SUB. An inner wall of the hole CH has a sloped surface of a tapered shape protruding in a larger degree at the lower side. At the inside of the hole CH, three sloped surfaces are formed. One is a sloped surface which extends through the inner wall of the organic insulating film FPS and the inner wall of the inorganic insulating film PAS over the region of the drain electrode film SDM, to the upper surface of the drain electrode film SMD. The second is a sloped surface which extends through the inner wall of the organic insulating film FPS, the inner wall of the inorganic insulating film PAS, and the inner wall of the gate insulating film GI over the region where the gate electrode film GM is present and the drain electrode film SDM is not present, to the upper surface of the gate electrode film GM. The third is a sloped surface which connects the upper surface of the drain electrode film SDM and the upper surface of the gate electrode film GM, and extends from the inner wall of the drain electrode film SDM through the gate insulating film GI, to the upper surface of the gate electrode film GM. In addition, the conductive film SC is formed over the inside of the hole CH including the above-described sloped surfaces and the peripheral portion of the hole CH. The thickness of the organic insulating film FPS at the interlayer switching sections C1 and C2 and the periphery thereof is thinner compared to the thickness in the pixel region. In the present embodiment, the hole CH forms a recess.

With this structure, a region which connects the gate electrode film GM and the drain electrode film SDM is formed only in the gate insulating film GI which is lower than the layer of the drain electrode film SDM, and, thus, the physical contact to the conductive film SC formed thereover can be further suppressed compared to the first preferred embodiment. With such a structure, the possibility of disconnection due to scratches or the like can further be reduced. In addition, because the gate insulating film GI is harder compared to the organic insulating film FPS, elastic deformation does not tend to occur, and, with this structure also, the occurrence of the scratches and cracks can be suppressed and the possibility of disconnection can be reduced. Because the gate electrode film GM and the drain electrode film SDM are in contact with the conductive film SC not only at the end surface, but also at the upper surface, the possibility of disconnection due to deficient formation of the conductive film SC is relatively low.

In order to form the structure of the interlayer switching section C1 as described, the following process is applied in the manufacturing process of the array substrate TS. When the drain electrode film SDM is patterned, the drain electrode film SDM is patterned to overlap the gate electrode film in the plane. In addition, when the photosensitive organic resin film is exposed from the state of FIG. 9, all of the organic insulating film FPS is removed over the region of the hole CH. In the region where the organic insulating film FPS is to be left over the line region around the terminal portion TLA, the halftone exposure is applied.

Third Preferred Embodiment

As a display device according to a third preferred embodiment of the present invention has a structure similar to the structure of the first preferred embodiment (refer to FIGS. 1-5) except for the interlayer switching sections C1 and C2, in the following, a difference, from the first preferred embodiment, in the structure of the interlayer switching section C1 and the manufacturing process of the array substrate TS in the third preferred embodiment will be primarily described.

Figure 16:
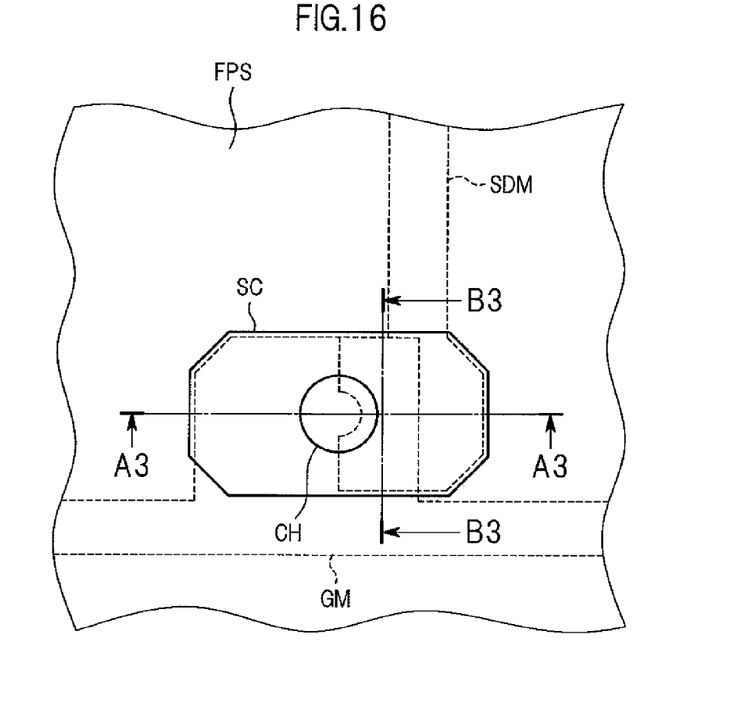
FIG. 16 is a plan view of an interlayer switching section according to a third preferred embodiment of the present invention.

FIG. 16 is a plan view of the interlayer switching section C1 in the third preferred embodiment. The structures to which the drain electrode film SDM and the gate electrode film GM are connected are similar to those in the first preferred embodiment. As is clear from FIG. 16, the gate electrode film GM has a region having a rectangular shape with two beveled corners in the plane and the drain electrode film SDM has a region having a rectangular shape with two beveled corners in the plane and with the center portion of the non-beveled side cut out in a semi-circular shape. The sizes of the two regions of the approximate rectangular shape are approximately equal to each other. In the plane, the structure is configured such that a region of a predetermined width from the side where there is the cutout in the region of the drain electrode film SDM and the region of a predetermined width from the non-beveled side of the region of the gate electrode film GM overlap each other. That is, the regions are provided in a step shape. A circular hole CH is provided to include, in the plane, the semi-circular cutout of the drain electrode film SDM and the gate electrode film GM near the semi-circular cutout. Over the surface of the interlayer switching section, the region of the conductive film SC is formed over the inside of the above-described hole CH and over the periphery outside of the edge of the hole CH. More specifically, the region of the conductive film SC is provided to cover a region formed by a combination of the gate electrode film GM and the drain electrode film SDM in the plane. Over the surface of the region around this region, the organic insulating film FPS is exposed.

Figure 17:
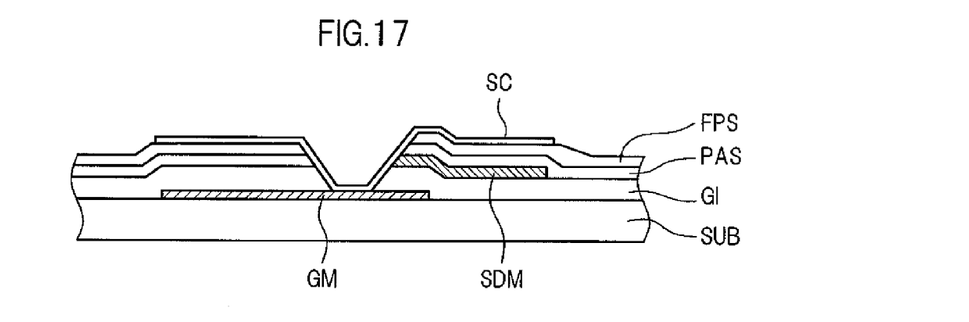
FIG. 17 is a cross sectional diagram along an A3-A3 cutting line of FIG. 16.
Figure 18:
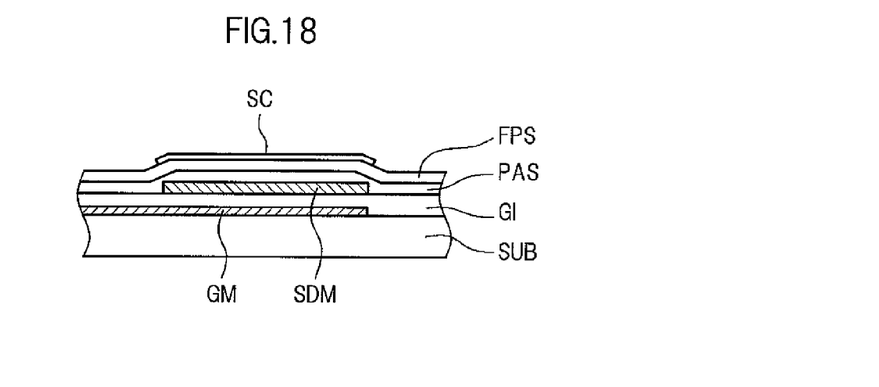
FIG. 18 is a cross sectional diagram along a B3-B3 cutting line of FIG. 16.

FIG. 17 is a cross sectional diagram along an A3-A3 cutting line of FIG. 16. FIG. 18 is a cross sectional diagram along a B3-B3 cutting line of FIG. 16. As is clear from FIGS. 17 and 18, at the interlayer switching section C1, the gate electrode film GM, the gate insulating film GI, the drain electrode film SDM, the inorganic insulating film PAS, and the organic insulating film FPS are sequentially layered over the substrate SUB. The inner wall of the hole CH has a sloped surface having a tapered shape protruding in a larger degree at a lower side. At the inside of the hole CH, two sloped surfaces are formed. One is a sloped surface extending through the inner wall of the organic insulating film FPS, the inner wall of the inorganic insulating film PAS, and the inner wall of the gate insulating film GI over the region of the drain electrode film SDM, to the upper surface of the gate electrode film GM. The other is a sloped surface which extends through the inner wall of the organic insulating film FPS, the inner wall of the inorganic insulating film, the inner wall of the drain electrode film SDM, and the inner wall of the gate insulating film GI over a region where the gate electrode film GM is present and the drain electrode film SDM is not present, to the upper surface of the gate electrode film GM. In addition, the conductive film SC is formed over the inside of the hole CH including the above-described sloped surfaces and over the periphery of the hole CH. The thickness of the organic insulating film FPS over the interlayer switching sections C1 and C2 and the periphery thereof is thinner compared to the thickness in the pixel region. In the present embodiment, the hole CH forms a recess.

With this structure, a region which connects the gate electrode film GM and the drain electrode film SDM is formed only in the gate insulating film GI which is lower than the layer of the drain electrode film SDM, and, thus, the physical contact with respect to the conductive film SC formed over this region can be further suppressed than the first preferred embodiment. With such a configuration, the possibility of the disconnection due to scratches or the like can be reduced. In addition, because the gate insulating film GI is harder compared to the organic insulating film FPS, elastic deformation tends to not occur, and, with this structure also, the occurrences of the scratches and cracks can be suppressed and the possibility of the disconnection can be reduced. Moreover, the interlayer switching section C1 can be formed with a smaller size compared to the second preferred embodiment.

In order to form the structure of the interlayer switching section C1 as described, the following is applied in the manufacturing process of the array substrate TS. When the drain electrode film SDM is formed, the drain electrode film is formed to overlap, in the plane, the gate electrode film. In addition, when the photosensitive organic resin film is exposed from the state of FIG. 9, all of the organic insulating film FPS is removed over the region of the hole CH. In the region where the organic insulating film FPS is left over the line region around the terminal portion TLA, the halftone exposure is applied.

Fourth Preferred Embodiment

As a display device according to a fourth preferred embodiment of the present invention has a structure similar to that of the first preferred embodiment (refer to FIGS. 1-5) except for the interlayer switching sections C1 and C2, in the following, a difference in the structure of the interlayer switching section C1 and the manufacturing process of the array substrate TS in the fourth preferred embodiment from the second preferred embodiment which has a relatively similar structure will be primarily described.

Figure 19:
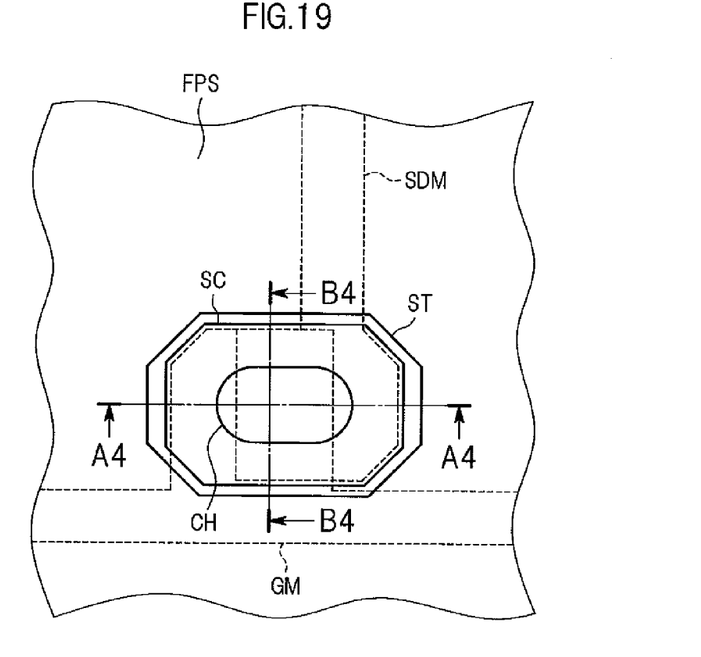
FIG. 19 is a plan view of an interlayer switching section according to a fourth preferred embodiment of the present invention.

FIG. 19 is a plan view of the interlayer switching section C1 in the fourth preferred embodiment, and corresponds to FIG. 13 showing the second preferred embodiment. Over the surface of the interlayer switching section, a ring-shaped step ST is provided, and, in this region, the thickness of the organic insulating film FPS is thinner compared to the region outside of this region and the height is lower. At the inside of the ring-shaped step, an elliptical hole CH is formed. The shape of the hole CH is similar to that in the second preferred embodiment. The region of the conductive film SC overlaps and covers a region formed by a combination of the gate electrode film GM and the drain electrode film SDM formed in a same shape in the plane as the second preferred embodiment, and the region of the conductive film SC extends to the inside of the step ST and the hole CH.

Figure 20:
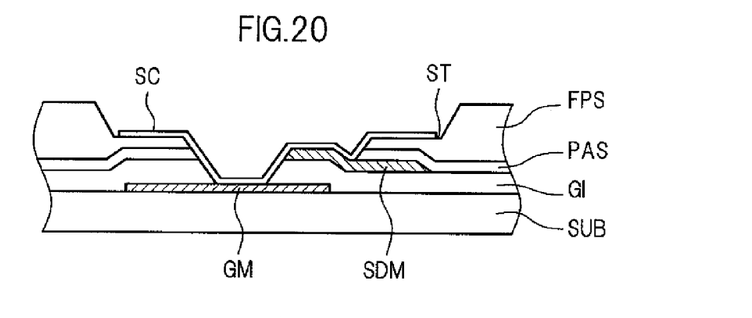
FIG. 20 is a cross sectional diagram along an A4-A4 cutting line of FIG. 19.
Figure 21:
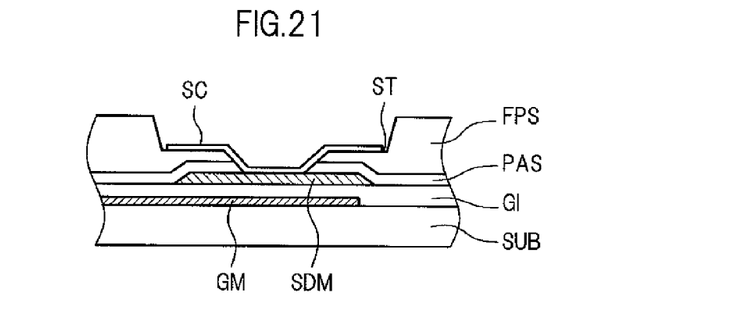
FIG. 21 is a cross sectional diagram along a B4-B4 cutting line of FIG. 19.

FIG. 20 is a cross sectional diagram along an A4-A4 cutting line of FIG. 19 and corresponds to FIG. 14 showing the second preferred embodiment. FIG. 21 is a cross sectional diagram along a B4-B4 cutting line of FIG. 19, and corresponds to FIG. 15 showing the second preferred embodiment. As is clear from FIGS. 20 and 21, in the interlayer switching section C1, a region of a thick thickness of the organic insulating film FPS and the step inside this region exist. At the inside of the step ST, the hole CH is formed, and a sloped surface similar to the second preferred embodiment is formed in the hole CH. The conductive film SC is formed over the inside of the hole CH including the above-described sloped surface and the step ST at the periphery of the hole CH. In the present embodiment, the step ST and the hole CH in the step ST form a recess.

With this structure, because all regions of the conductive film SC is formed in the recess, the physical contact can further be suppressed compared to the second preferred embodiment, and, consequently, the possibility of disconnection can be further reduced.

In order to form the structure of the interlayer switching section C1 as described above, the following is applied in the manufacturing process of the array substrate TS. When the drain electrode film SDM is patterned, the drain electrode film SDM is patterned to overlap the gate elected film in the plane. In addition, when the photosensitive organic resin film is exposed from the state of FIG. 9, a halftone exposure is applied in the region of the step.

Fifth Preferred Embodiment

A display device according to a fifth preferred embodiment of the present invention has a structure similar to that of the first preferred embodiment (refer to FIGS. 1-5) except for the interlayer switching sections C1 and C2, and will not be described in detail. In the following, a difference in the structure of the interlayer switching section C1 and the manufacturing process of the array substrate TS in the fifth preferred embodiment from the third preferred embodiment which has a similar structure will be primarily described.

Figure 22:
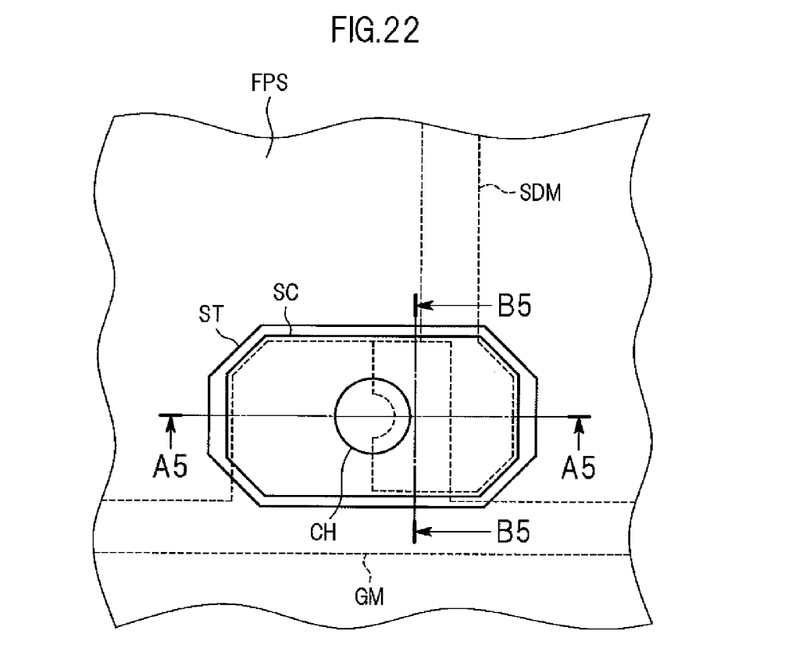
FIG. 22 is a plan view of an interlayer switching section according to a fifth preferred embodiment of the present invention.

FIG. 22 is a plan view of the interlayer switching section C1 of the fifth preferred embodiment, and corresponds to FIG. 16 showing the third preferred embodiment. A ring-shaped step ST is present over the surface of the interlayer switching section, and in this region, the thickness of the organic insulating film FPS is thinner and the height is lower compared to the region outside of this region. At the inside of the ring-shaped step ST, a circular hole CH is formed. The shape of the hole CH is similar to that of the third preferred embodiment. The region of the conductive film SC is formed to overlap and cover a region formed by a combination between the gate electrode film GM and the drain electrode film SDM which are formed in a same shape as the third preferred embodiment in the plane. The region of the conductive film SC also extends to the step ST and the inside of the hole CH.

Figure 23:
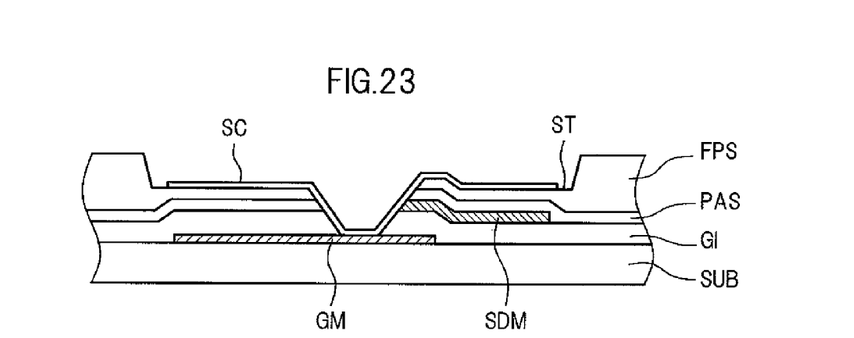
FIG. 23 is a cross-sectional diagram along an A5-A5 cutting line of FIG. 22.
Figure 24:
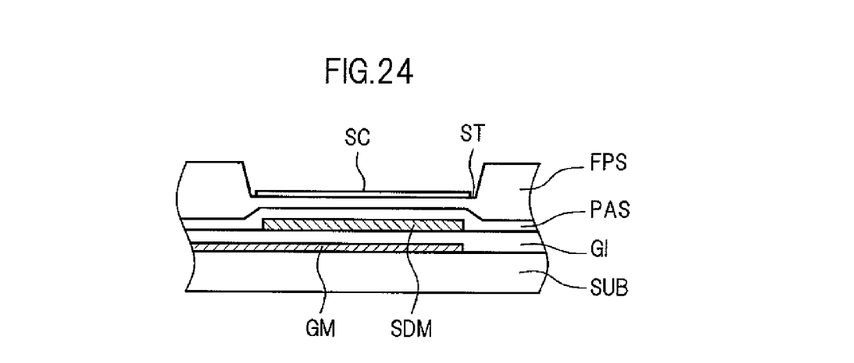
FIG. 24 is a cross sectional diagram along a B5-B5 cutting line of FIG. 22.

FIG. 23 is a cross sectional diagram along an A5-A5 cutting line of FIG. 22 and corresponds to FIG. 17 showing the third preferred embodiment. FIG. 24 is a cross sectional diagram along a B5-B5 cutting line of FIG. 22 and corresponds to FIG. 18 showing the third preferred embodiment. As is clear from FIGS. 23 and 24, in the interlayer switching section C1, a region where the thickness of the organic insulating film FPS is thick and a step ST inside this region are present. At the inside of the step ST, the hole CH is formed, and a sloped surface similar to the third preferred embodiment is formed in the hole CH. The conductive film SC is formed over the inside of the hole CH including the sloped surface and the step ST at the periphery of the hole CH. In the present embodiment, the step ST and the hole CH inside the step ST form a recess.

With this structure, because all regions of the conductive film SC is formed in the recess, the occurrence of the physical contact can further be suppressed compared to the third preferred embodiment, and, consequently, the possibility of the disconnection can further be reduced.

In order to form the structure of the interlayer switching section C1 as described above, the following is applied in the manufacturing process of the array substrate TS. When the drain electrode film SDM is patterned, a configuration is employed such that the drain electrode film SDM and the gate electrode film are overlapped in the plane. In addition, when the photosensitive organic resin film is exposed from the state of FIG. 9, the region of the step is halftone-exposed.

While there have been described what are at present considered to be certain embodiments of the invention, it will be understood that various modifications may be made thereto, and it is intended that the appended claims cover all such modifications as fall within the true spirit and scope of the invention.

For example, in the above-description of the preferred embodiments, an IPS liquid crystal display device is exemplified, but the present invention is not limited to such a configuration and may be applied to other display devices such as a TN liquid crystal display device, a VA liquid crystal display device, and a display device which uses an organic EL panel. In these display devices also, the interlayer switching section is required for electrically connecting lines present on a plurality of conductive layers, around the driver IC or the like, and the structure including the layering order of the conductive layer and the insulating layer of the array substrate TS does not differ depending on these different types.

What is claimed is:

1. A display device comprising:
   a first conductive layer in which a first electrode film is formed;
   a first insulating layer provided over the first conductive layer;
   a second conductive layer provided over the first insulating layer and in which a second electrode film is formed at a position, in plane, different from the first electrode film; and
   a second insulating layer provided over the second conductive layer, wherein
   a recess is formed over a surface of the second insulating layer, the recess having, in its inside, a first region in which the first electrode film is exposed, a second region in which the second electrode film is exposed, and a third region which connects the first region and the second region, and a conductive film is formed at least in the first through the third regions.

2. The display device according to claim 1, wherein
   in the recess, a first hole which is formed through the second insulating layer and the first insulating layer and reaches the first electrode film, a second hole which is formed distanced from the first hole and which is formed through the second insulating layer and reaches the second electrode film, and a channel which connects the first hole and the second hole are formed.

3. The display device according to claim 1, wherein
   the first electrode film and the second electrode film are provided with edges overlapping each other in the plane,
   a sloped surface extending from an inner wall of the second electrode film to an upper surface of the first electrode film is formed in the recess, and
   the conductive film is formed at least over the sloped surface.

4. The display device according to claim 3, wherein
   in the recess, the sloped surface extends to an upper surface of the second electrode film.

5. The display device according to claim 3, wherein
   the conductive film is formed at a periphery portion which is outside of an edge of the recess.

6. The display device according to claim 3, further comprising:
   a step provided inside the edge of the recess and having a height lower than an outside of the edge, wherein
   the conductive film is formed over the step.

7. The display device according to claim 1, wherein
   the second insulating layer is formed with a plurality of films of different materials.

8. The display device according to claim 7, wherein
   the second insulating layer includes an organic insulating film.

9. A display device comprising:
   a first conductive layer;
   a first insulating layer provided over the first conductive layer;
   a second conductive layer provided over the first insulating layer; and
   a second insulating layer provided over the second conductive layer; wherein
   a first contact hole formed in the second insulating layer over the first conductive layer and a second contact hole formed in the second insulating layer over the second conductive layer are formed,
   a channel which connects the first contact hole and the second contact hole is formed in the second insulating layer, and
   the first conductive layer and the second conductive layer are electrically connected by a third conductive layer formed in the first contact hole, the second contact hole, and the channel.

10. The display device according to claim 9, wherein
    the second insulating layer includes an organic insulating film.

11. The display device according to claim 10, wherein
    the third conductive layer is a transparent conductive film.

12. The display device according to claim 10, wherein
    the display device comprises a plurality of pixel electrodes; and
    the third conductive layer and the pixel electrode are transparent conductive films formed in a same layer.

13. The display device according to claim 11, wherein
    the display device comprises a plurality of pixel electrodes and a plurality of thin film transistors which are connected to the plurality of pixel electrodes, and
    gate electrodes of the plurality of thin film transistors are connected to the first conductive layer through a testing transistor, the second conductive layer, and the third conductive layer.

* * * * *